Figure 1:
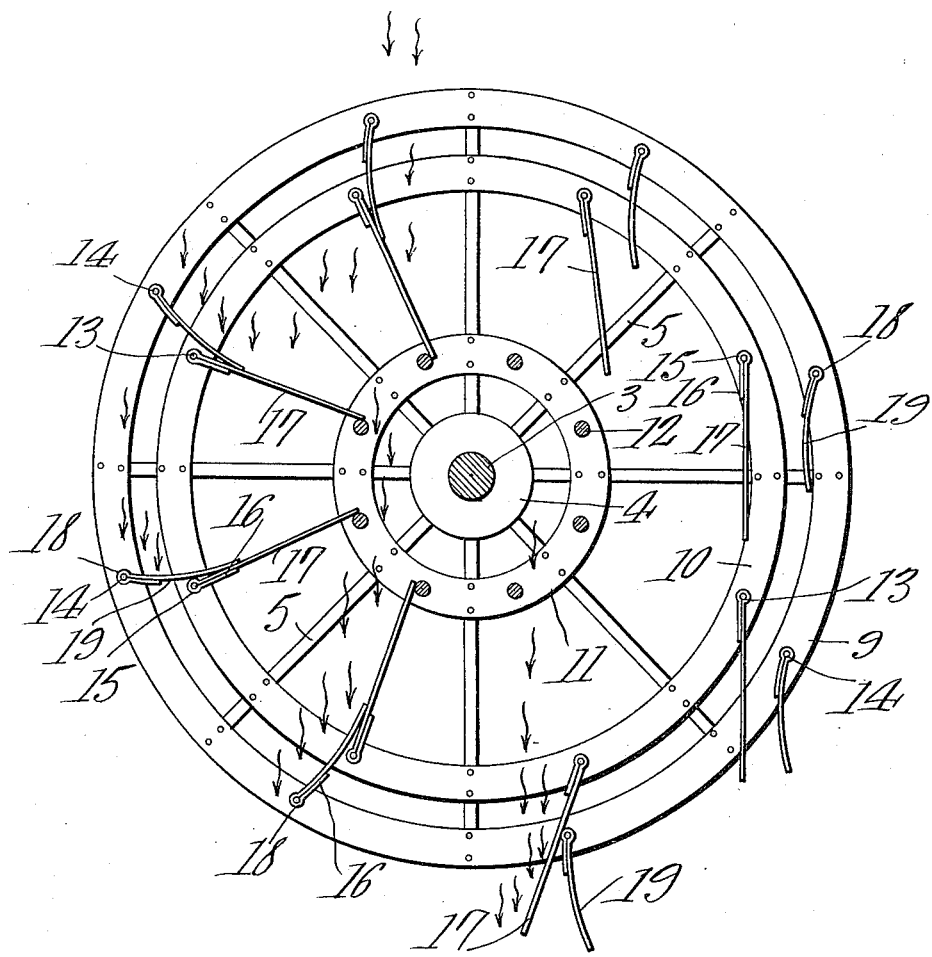

W. E. SEELYE.
WATER WHEEL.
APPLICATION FILED APR. 17, 1911.

1,008,372.

Patented Nov. 14, 1911.
2 SHEETS—SHEET 1.

Witnesses

William E. Seelye
Inventor
by
Attorneys

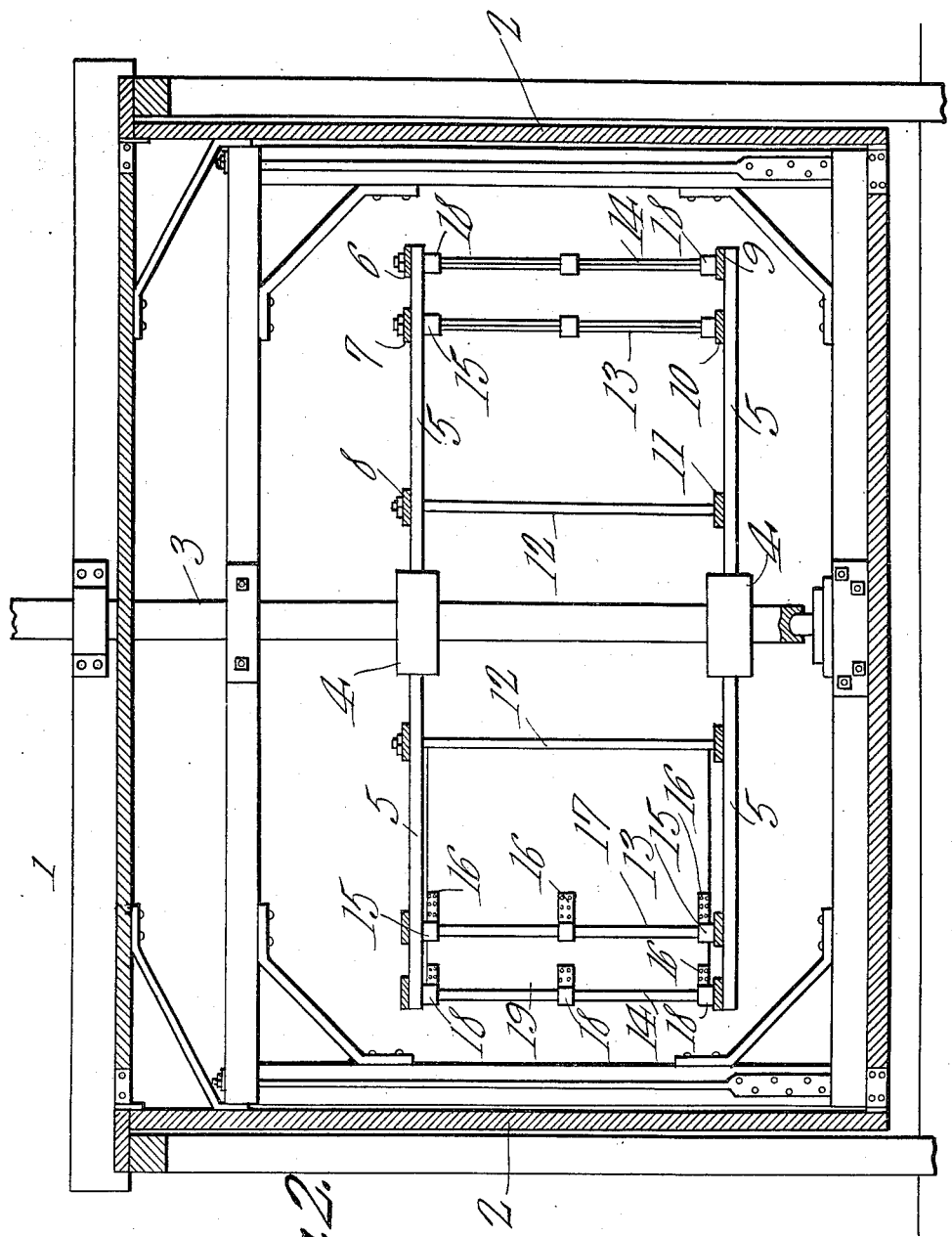

UNITED STATES PATENT OFFICE.

WILLIAM E. SEELYE, OF SPOKANE, WASHINGTON.

WATER-WHEEL.

1,008,372.  Specification of Letters Patent.  Patented Nov. 14, 1911.

Application filed April 17, 1911. Serial No. 621,537.

*To all whom it may concern:*

Be it known that I, WILLIAM E. SEELYE, a citizen of the United States, residing at Spokane, in the county of Spokane and State of Washington, have invented a new and useful Water-Wheel, (Case C,) of which the following is a specification.

This invention relates to water wheels of that type designed to be partly or entirely submerged within a body of water, and which has blades pivotally mounted relative to each other and adapted to feather when moving against the current and to automatically move to active position upon arriving at the power side of the wheel.

One of the objects of the invention is to provide a wheel having its blades mounted to swing about axes parallel with the axes of rotation of the wheel, preferably two series of these blades being utilized, the blades of one series constituting means for increasing the area presented to the current, and prolonging the active period of the blades without increasing the resistance to the movement of the blades against the current when said blades are in feathering position.

A further object is to provide a wheel having concentric series of feathering blades, the blades of the two series coöperating to present dished or concave surfaces to the current.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings. Figure 1 is a horizontal section through a wheel constructed in accordance with the present invention, the relative positions of the blades when subjected to the force of a current, being illustrated. Fig. 2 is a vertical transverse section through the wheel.

Referring to the figures by characters of reference 1 designates a frame of any preferred construction and which is adapted to be mounted within a flume 2 or the like, this frame having a shaft 3 journaled therein. Collars 4 are secured to the shaft and have spokes 5 radiating therefrom, said spokes carrying upper concentric rings 6 and 7 and 8 and lower concentric rings 9, 10 and 11, there being rods 12 connecting the rings 8 and 11 and located between the upper and lower spokes. These rods 12 constitute stops as will hereinafter be described.

Arranged between the rings 7 and 10 are pivot rods 13 interposed between the spokes 5, these rods being preferably equidistant from the spokes between which they are mounted. Another set of rods 14 connect the rings 6 and 9. Each of the rods 13 is loosely engaged by sleeves 15 having leaves 16 extending therefrom and riveted or otherwise attached to a flat blade 17 extending close to the spokes and adapted to swing therebetween about the rod 13 as an axis. The width of each blade is slightly greater than the distance between its rod 13 and the adjacent rod 12, so that when the blade has been swung inwardly toward the center of the wheel it will come against one of the rods 12 and thus be held against further movement in the same direction about its pivot. Each of the rods 14 has sleeves 18 loosely mounted thereon and similar to the sleeves 15, these sleeves 18 being secured to a curved blade 19 the width of each blade being slightly greater than the distance between the adjacent rods 13 and 14.

When a current of water is directed into and through the flume 2 in which the water wheel is located, the flat blade 17 at one side of the wheel will swing inwardly against the top rods 12 in the path thereof and the adjoining curved blades 19 will swing against the outer portions of the blades 17, thus presenting a concaved or dished surface extending from the periphery of the wheel inwardly to the rods 12. The advantage in having this arrangement of blades will be apparent by referring to the drawings wherein it will be seen that a portion of the current directed against the wheel will pass between the shaft 3 and inner edge portions of the blades 17, thus presenting all of the active blades to portions of the current and therefore increasing the power of the wheel. Moreover during the final stage of the active period of each pair of blades, the curved blade of the pair will be held at a greater angle relative to the direction of the current than the flat blade, thus operating to give added power to the wheel after the effectiveness of the flat blade of the pair has practically ceased. As soon as the blades pass back of the shaft 3 and again come into the current, they are swung backwardly, the flat blade of each pair pressing against its adjoining curved blade and throwing it backwardly so that the two blades of each pair will feather as they move against the current and will thus move easily through the water and with practically no hindrance. The blades of each pair gradually shift to set position as they pass across the front of the shaft 3 and the straight blades successively assume positions against their stop rods 12 while the curved blades move against their straight blades and thus again present curved or dished surfaces to the current.

What is claimed is:—

A water wheel including a shaft, spokes radiating therefrom, said spokes being disposed in upper and lower series, concentric rings secured upon each series of spokes, stop devices carried by the inner rings of the series, a series of flat blades pivotally mounted between the intermediate rings of the series and shiftable successively against the stop devices, and curved blades following the flat blades and pivotally mounted between the outer rings of the series and movable against the adjacent flat blades at the power side of the wheel, all of said blades being adapted to feather when moving against the current, the inner blades being adapted to be reversed by the current and to reverse the outer blades when passing to the feathering side of the wheel, said outer blades holding the reversed inner blades in active position during the first portion of their movement at the feathering side of the wheel.

In testimony that I claim the foregoing as my own, I have hereto affixed my signature in the presence of two witnesses.

WILLIAM E. SEELYE.

Witnesses:
H. S. STOOLFIRE,
R. S. CORDINER.

Copies of this patent may be obtained for five cents each, by addressing the "Commissioner of Patents, Washington, D. C."